US011682042B2

(12) United States Patent
Lin

(10) Patent No.: US 11,682,042 B2
(45) Date of Patent: Jun. 20, 2023

(54) IMAGE CAPTURE INTERFACE

(71) Applicant: Google LLC, Mountain View, CA (US)

(72) Inventor: Jennifer W. Lin, San Jose, CA (US)

(73) Assignee: Google LLC, Mountain View, CA (US)

( * ) Notice: Subject to any disclaimer, the term of this patent is extended or adjusted under 35 U.S.C. 154(b) by 380 days.

(21) Appl. No.: 15/410,266

(22) Filed: Jan. 19, 2017

(65) Prior Publication Data

US 2017/0140432 A1 May 18, 2017

Related U.S. Application Data

(63) Continuation of application No. 12/886,295, filed on Sep. 20, 2010, now abandoned.

(51) Int. Cl.
*G06Q 30/00* (2023.01)
*G06Q 30/0251* (2023.01)
(Continued)

(52) U.S. Cl.
CPC ......... *G06Q 30/0261* (2013.01); *G06Q 30/00* (2013.01); *G06Q 30/0246* (2013.01);
(Continued)

(58) Field of Classification Search
CPC ............................ H04L 12/28; G06Q 30/0261
See application file for complete search history.

(56) References Cited

U.S. PATENT DOCUMENTS 6,463,220 B1 10/2002 Dance et al.
2004/0239799 A1* 12/2004 Suzuki ................. H04N 5/2256
348/370

(Continued)

FOREIGN PATENT DOCUMENTS

KR 10-0727402 6/2007
KR 10-0856820 9/2008
KR 10-2010-0049894 5/2010

OTHER PUBLICATIONS

International Preliminaiy Report on Patentability from International Application No. PCT/US2011/052174 dated Apr. 4, 2016, 6 pages.
(Continued)

*Primary Examiner* — Alvin L Brown
(74) *Attorney, Agent, or Firm* — Fish & Richardson P.C.

(57) ABSTRACT

This specification describes technologies relating to capturing an image. In general, one aspect of the subject matter described in this specification can be embodied in a device that includes a camera, a GPS receiver, and an application. The application is executed by a data processing apparatus that interacts with the camera, the GPS receiver, and one or more remote servers, to perform operations comprising: activating the camera; presenting, in a display of the device, a digital presentation of a document; guiding a user to capture an image of the document, including presenting, within the display, a user interface feature that visually frames a particular subset of information that is included in the document with other information; capturing the image of the document when the particular subset of information is focused in the camera's view; and uploading the captured image of the document to the one or more remote servers.

18 Claims, 5 Drawing Sheets

(51) Int. Cl.
  *G06Q 30/0242* (2023.01)
  *H04L 67/01* (2022.01)
  *H04N 23/60* (2023.01)
  *H04N 23/63* (2023.01)

(52) U.S. Cl.
  CPC ........... *H04L 67/01* (2022.05); *H04N 23/635* (2023.01); *H04N 23/64* (2023.01)

(56) References Cited

U.S. PATENT DOCUMENTS

| | | |
|---|---|---|
| 2005/0216193 A1 | 9/2005 | Dorfman et al. |
| 2006/0178947 A1 | 8/2006 | Zsigmond et al. |
| 2006/0212350 A1 | 9/2006 | Ellis et al. |
| 2007/0073585 A1* | 3/2007 | Apple .................. G06Q 30/02 705/14.46 |
| 2007/0164106 A1 | 7/2007 | McDevitt et al. |
| 2007/0165654 A1* | 7/2007 | Chai ....................... H04L 41/00 370/401 |
| 2008/0114639 A1 | 5/2008 | Meek et al. |
| 2009/0284637 A1* | 11/2009 | Parulski ............. H04N 1/00183 348/333.12 |
| 2009/0313101 A1 | 12/2009 | McKenna et al. |
| 2010/0100545 A1 | 4/2010 | Jeavons |
| 2010/0228593 A1 | 9/2010 | Belwadi et al. |
| 2010/0250331 A1 | 9/2010 | Devaraj et al. |
| 2011/0258035 A1 | 10/2011 | Oren et al. |
| 2011/0302036 A1 | 12/2011 | Fordyce et al. |
| 2012/0072280 A1 | 3/2012 | Lin |
| 2012/0130794 A1* | 5/2012 | Strieder ................ G06Q 30/02 705/14.27 |
| 2015/0142645 A1* | 5/2015 | Heit ....................... G06Q 20/04 705/39 |
| 2017/0026893 A1* | 1/2017 | Lagassey ............... G07C 5/008 |

OTHER PUBLICATIONS

International Search Report and Written Opinion dated May 1, 2012 from related International Application No. PCT/US2011/052174, 9 pages.

* cited by examiner

IMAGE CAPTURE INTERFACE

BACKGROUND

The present disclosure relates to content presentation.

Advertisers provide advertisements in different forms in order to attract consumers. Ads can be provided in electronic form. For example, electronic ads can be provided as banner ads on a web page, as ads presented with search results, or as ads presented in a mobile application.

SUMMARY

This specification describes technologies relating to content presentation.

In general, one aspect of the subject matter described in this specification can be embodied in methods that include the actions of presenting one or more ads to a user; receiving point of sale receipt information from the user, where the receipt image is associated with a redemption of a first ad of the one or more ads presented to the user, the redemption occurring at a physical retail location; processing the point of sale receipt information, using one or more processors, to extract text associated with the receipt information; determining that the extracted text associated with the receipt information is associated with the first ad presented to the user; and logging a conversion for the first ad. Other embodiments of this aspect include corresponding systems, apparatus, and computer program products.

These and other embodiments can optionally include one or more of the following features. Processing the receipt information further includes identifying one or more receipt templates associated with one or more advertisers; identifying ads presented to the user, each ad being associated with one or more keywords; and using the receipt templates and keywords for ads presented to the user in extracting text from the receipt information. The receipt templates each identify specific receipt information associated with a particular advertiser. Determining that the extracted text is associated with an ad further includes identifying ads presented to the user; and matching keywords associated with the ads presented to the user with the extracted text. Identifying ads presented to the user includes identifying ads presented to the user in an ads log using an identifier of the user. The method further includes receiving a user identifier with the receipt information; and using the user identifier to identify the one or more ads presented to the user. The receipt information is a receipt image.

Particular embodiments of the subject matter described in this specification can be implemented to realize one or more of the following advantages. Conversion tracking is improved by capturing conversions associated with advertisements that occur at physical retail locations. Conversion tracking allows for tracking beyond clicks on a webpage to include user interactions with devices, e.g., shaking of the phone, voice, etc.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

As used in this specification, offline conversions of electronic content items (e.g., advertisements) can refer, for example, to conversions that occur when a user views a content item online, but performs some conversion event at another physical location (e.g., a redemption of the content item at a physical retail store location). Thus, an offline conversion location can refer to a physical location in contrast to an electronic storefront, e.g., as a web page store, even though the transaction may still use network communications between the store and one or more network locations. For example, a user can view an advertisement for a particular product (e.g., presented on a web page or with search result listings) and then purchase that product at a physical retail store location.

A conversion is identified in order to link the conversion to the content item, for example, in order to properly charge the advertiser and/or credit the publisher of the content item. In particular, conversions associated with physical retail store locations are identified by receiving an electronic version of the user's point of sale receipt information (e.g., an image of the receipt or an electronic receipt), which is then processed to identify the content of the receipt. The content is matched to the associated content item in order to identify the conversion as associated with a particular content item presented to the user.

While reference will be made below to advertising systems and methods, other forms of content including other forms of sponsored content can be managed, presented, and tracked in accordance with the description below.

Figure 1:
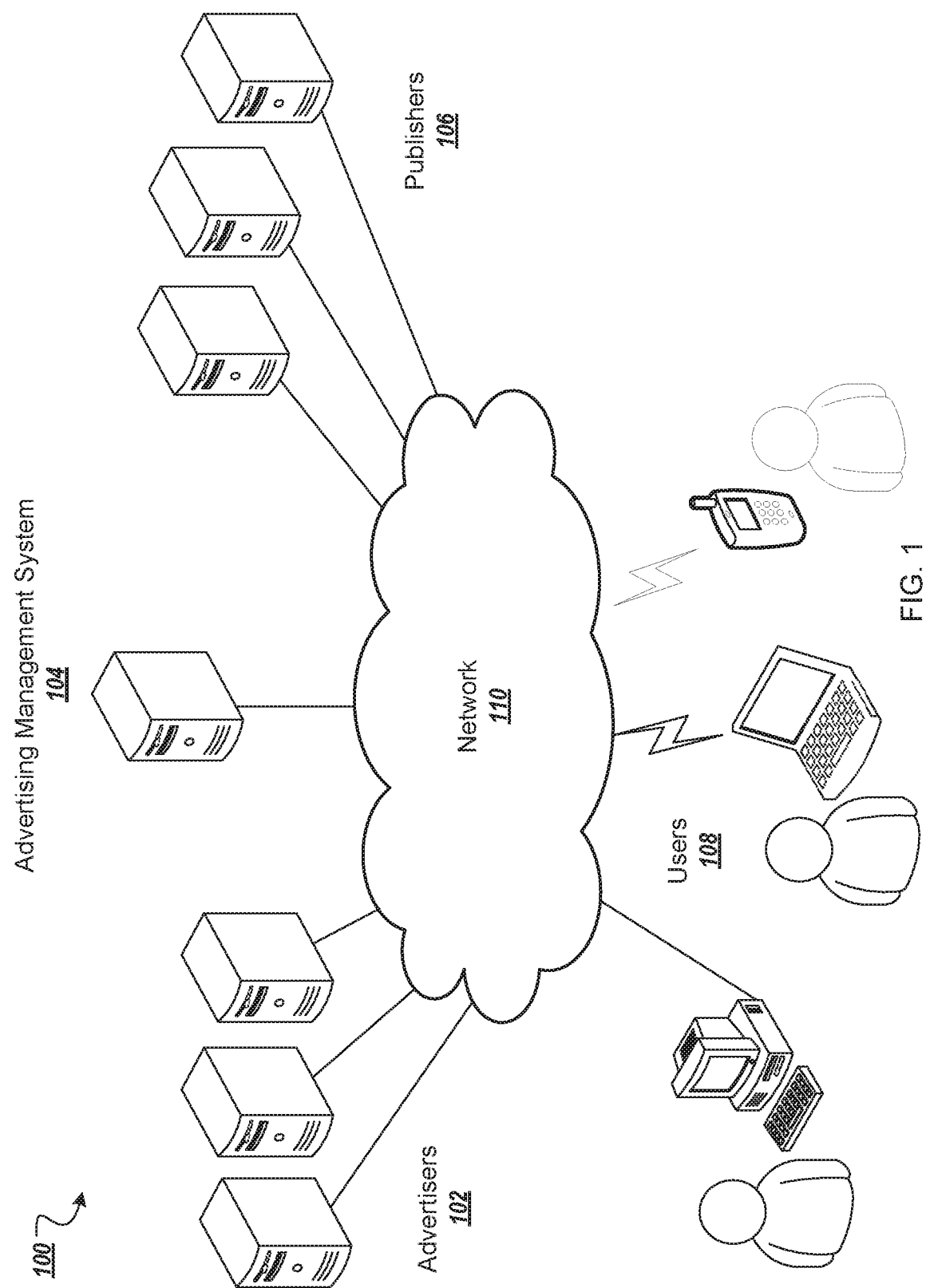
FIG. 1 is a block diagram of an example content presentation system.

FIG. 1 is a block diagram of an example content presentation system 100. In some implementations, one or more advertisers 102 can directly, or indirectly, enter, maintain, and track ad information in an advertising management system 104. Though reference is made to advertising, other forms of content, including other forms of sponsored content, can be delivered by the system 100. The ads can be in the form of graphical ads, such as banner ads, text only ads, image ads, barcode ads (e.g., ads including one or more barcodes that can be used in redeeming the ad), audio ads, video ads, animated ads, ads combining one or more of any of such components, etc. The ads can also include embedded information, such as links, meta-information, and/or machine executable instructions. One or more publishers 106 can submit requests for ads to the advertising management system 104. The advertising management system 104 responds by sending ads to the requesting publisher 106 for placement on or association with one or more of the publisher's content items (e.g., web properties). Example web properties can include web pages, television and radio advertising slots, or print media space.

Other entities, such as users 108 and the advertisers 102, can provide usage information to the advertising management system 104, such as, for example, whether or not a conversion (e.g., a purchase or other interaction) or a click-through related to an ad (e.g., a user has selected an ad) has occurred. This usage information can include measured or observed user behavior related to ads that have been served. The advertising management system 104 can perform financial transactions, for example, crediting the publishers 106 and charging the advertisers 102 based on the usage information.

A network 110, such as a local area network (LAN), wide area network (WAN), the Internet, one or more telephony networks or a combination thereof, connects the advertisers 102, the advertising management system 104, the publishers 106, and the users 108.

One example publisher 106 is a general content server that receives requests for content (e.g., articles, discussion threads, music, video, graphics, search results, web page listings, information feeds, etc.), and retrieves the requested content in response to the request. The content server can submit a request for ads to an advertisement server in the advertising management system 104. The ad request can include a number of ads desired. The ad request can also include content request information. This information can include the content itself (e.g., page, video broadcast, radio show, or other type of content), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server or a client browser combines the requested content with one or more of the ads provided by the advertising management system 104. The combined content and ads can be sent/rendered to the users 108 that requested the content for presentation in a viewer (e.g., a browser or other content display system). The content server can transmit information about the ads back to the advertisement server, including information describing how, when, and/or where the ads are to be rendered (e.g., in HTML or JavaScript™).

Another example publisher 106 is a search service. A search service can receive queries for search results. In response, the search service can retrieve relevant search results from an index of documents (e.g., from an index of web pages). Search results can include, for example, lists of web page titles, snippets of text extracted from those web pages, and hypertext links to those web pages, and can be grouped into a predetermined number of (e.g., ten) search results.

The search service can submit a request for ads to the advertising management system 104. The request can include a number of ads desired. This number can depend, for example, on the search results, the amount of screen or page space occupied by the search results, the size and shape of the ads, etc. The request for ads can also include the query (as entered or parsed), information based on the query (such as geo-location information, whether the query came from an affiliate and an identifier of such an affiliate), and/or information associated with, or based on, the search results. Such information can include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores are computed from, for example, dot products of feature vectors corresponding to a query and a document, page rank scores, and/or combinations of IR scores and page rank scores, etc.

In some implementations, the advertising management system 104 can use an auction process to select ads from the advertisers 102. For example, the advertisers 102 can be permitted to select, or bid, an amount the advertisers 102 are willing to pay for each presentation of or interaction with (e.g., click) of an ad, e.g., a cost-per-click amount an advertiser pays when, for example, a user clicks on an ad. The cost-per-click can include a maximum cost-per-click, e.g., the maximum amount the advertiser is willing to pay for each click of an ad based on a keyword, e.g., a word or words in a query. Other bid types, however, can also be used. Based on these bids, ads can be selected and ranked for presentation.

The search service can combine the search results with one or more of the ads provided by the advertising management system 104. This combined information can then be forwarded to the users 108 that requested the content. The search results can be maintained as distinct from the ads, so as not to confuse the user between paid ads and presumably neutral search results.

In some implementations, one or more publishers 106 submit requests for ads to the advertising management system 104. The advertising management system 104 responds by sending ads to the requesting publisher 106 for placement on one or more of the publisher's web properties (e.g., websites and other network-distributed content) that are relevant to the web property. For example, if a publisher 106 publishes a sports-related web site, the advertising management system 104 can provide sports-related ads to the publisher 106. In some implementations, the requests can instead be executed by devices associated with the user 108, e.g., by the execution of a particular script (e.g., javascript) when the publisher's web page is loading on a client device.

Another example publisher 106 is a mobile application developer. A mobile application is an application specifically designed for operation on a mobile device (e.g., a smart phone). The mobile application can also include ads positioned within the content of the mobile application. Similar to publishers 106 described above, the ads can be received from the advertising management system 104 for placement in the mobile application when accessed by a user (e.g., when a particular page of a mobile application is loaded on the mobile device).

Figure 2:
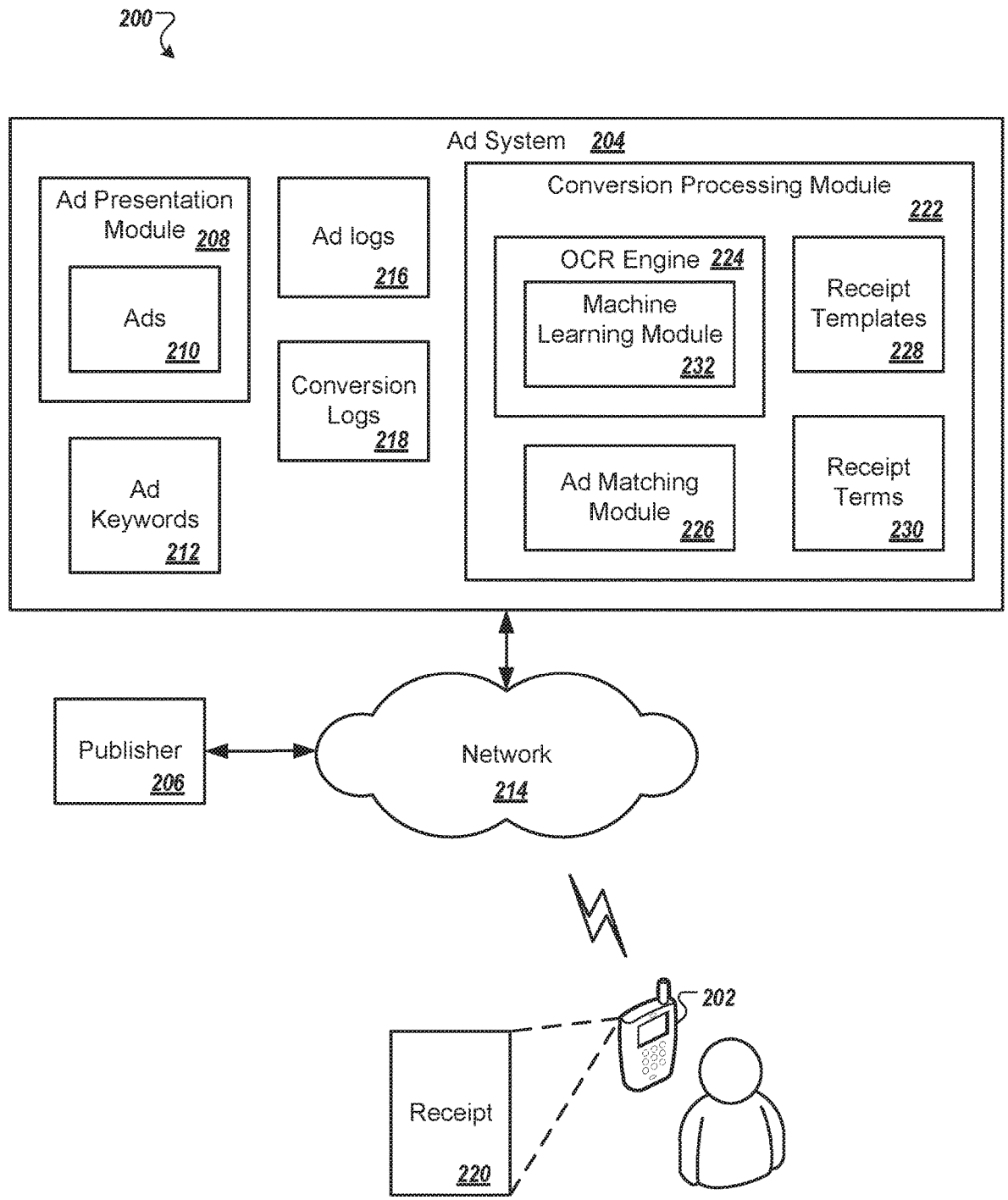
FIG. 2 shows a block diagram of an example system for processing conversions associated with physical retail location redemptions.

FIG. 2 shows a block diagram of an example system 200 for processing conversions associated with physical retail location redemptions. The system 200 is used for tracking ad conversions, for example, where an ad is presented to a user on a computing device and the user purchases a product or service associated with the ad in a physical retail store. The system 200 can track the conversion using, e.g., an electronic receipt, a credit card, or with a scanned receipt image. The conversion location can include, for example, a retail store, a kiosk, a boutique, a wholesaler, a market vendor, or an entertainment attraction.

The system 200 includes a mobile device 202 that can present content to a user. In some implementations, the mobile device 202 is a cellular telephone, a personal digital assistant, a tablet PC, or a netbook. While a mobile device 202 is shown, in some implementations, other devices can be used, for example, a laptop, a desktop computer, an Internet kiosk, a server, or a television with a set-top box. The mobile device 202 can include a web browser and other applications, e.g., news applications, e-mail applications, games, or utilities.

Content can be requested from an ad system 204 for presentation on a user interface of the mobile device 202 (e.g., along with other publisher content including search results, web pages, and application content). For example, a mobile device can request content from a publisher 206 (e.g., a web page) and the publisher 206 requests ads from the ad system 204. The ad system 204 can send the ads to the publisher 206 and the publisher 206 can send the requested content and the ads to the requesting application on the mobile device 202. Alternatively, the requesting mobile device can receive and combine the requested content from the publisher 206 and the ads from the ad system 204. Alternatively, the mobile device can directly request content from the ad server (e.g., as part of a mobile device application or as a browser request).

An ad presentation module 208 can determine the selection of one or more ads 210 to serve to the mobile device 202 with the requested content. The ads 210 can be selected and scored based on different criteria in order to match the ads 210 with the requested content. For example, the ad presentation module 208 identifies ads based on keywords associated with the ads that correspond with the requested content in which the ads are to be presented. In another example, the ad presentation module 208 can send a gaming application ads based on the specific game requesting the ads (e.g., the ads are for products or services that appeal to a typical user of the gaming application).

Each of the ads 210 on the ad system 204 can have a unique identifier ("AdID"). The ad system 204 can store a mapping of the AdID to ad keywords, for example, in an ad keywords file 212. For example, the ad keywords file 212 can map a business name, product or service name, X percentage off, or Y dollar amount saved to the AdID. The ad keywords can be selected based on the text or images in the ads 210, provided by advertisers, etc. The ad system 204 can periodically update the AdID to keyword mapping in the ad keywords file 212 based on ad modifications made by advertisers since the last periodic update. In some implementations, the mapping can be updated based on ad impressions to users. In some implementations, a separate server generates and updates the AdID to keyword mapping in the ad keywords file 212.

The ad system 204 sends the ads 210 and requested content to the mobile device 202 through a network 214. The network 214 can be the Internet, a local area network (LAN), a wide area network (WAN), or any combination thereof. In some implementations, the mobile device 202 can communicate with the ad system 204 through the network 214 using a type of wireless protocol, such as IEEE 802.11, WAP and/or Bluetooth. In some other implementations, the mobile device 202 is coupled to the network 214 using one or more physical cables (e.g., when the mobile device 202 is a desktop computer).

The ad system 204 can include one or more ad logs 216 for tracking ads presented on the mobile device 202. The ad logs 216 can include, for example, the ad identifier, an identifier for the user (e.g., a user identifier, profile identifier, device identifier), a time stamp for each particular presentation of the ad, etc. In some implementations, the user identifiers can be mapped to randomIDs in order to enhance user privacy. Alternatively, other anonymizing techniques can be used to provide user privacy.

A user of the mobile device 202 can select an ad presented in an application on the mobile device 202. Selection of an ad can present the user with additional information about the products or services displayed in the ad. For example, a web browser can present the user with additional product information. In other example, the mobile device 202 can prompt the user if they would like to print or e-mail a copy of a coupon presented in an ad. In some implementations, user interaction with an ad results in an online conversion. The online conversion can be stored in conversion logs 218. The conversion logs 218 can identify a conversion including the associated ad presentation, the user identifier, and timestamp for the conversion.

Conversions can be recorded in the conversion logs 218. For example, a user of the mobile device 202 can purchase advertised products or services online, for example, through a particular web page associated with the advertisement. For example, selection of the ad can direct the mobile device 202 to open a landing page that allows the user to purchase the advertised product. The ad system 204 can store conversion information in the conversion logs 218. The conversion logs 218 can include AdIDs, deviceIDs, and application IDs for tracking ad conversions.

Additionally, a user of the mobile device 202 can purchase advertised products or services at a physical retail location, e.g., from a retail store. The user can receive a receipt 220 for the purchased products or services. The receipt 220 can be a printed receipt (e.g., on paper) or an electronic receipt (e.g., a receipt sent by e-mail to the user). The mobile device 202 can include a camera, and a receipt conversion application. Additionally, the mobile device 202 can be connected to a scanner in order to capture an image of the receipt. The mobile device 202 can send the receipt image (as well as some identifier of the user) to the ad system 204. In some implementations, the mobile device 202 includes an application designed specifically to send receipt images to the ad system 204 or includes general applications (e.g., a browser) to send receipts to the ad system 204.

For example, the mobile device 202 can include a camera application that allows the user to send an image of the receipt 220 to the ad system 204. The camera application can be a standalone application, part of the mobile device's 202 camera application, or a mobile browser plug-in, to name a few examples. When initiated, the camera application can activate a camera in the mobile device 202. The user can take a photo of the receipt 220 with the camera application after the user has purchased a product or service.

In some implementations, the camera application guides the mobile user to assist in taking a clear image of the receipt 220. For example, the receipt details, e.g. business name, product or service name, timestamp of purchase, etc., can be boxed to ensure that the receipt details are focused in the camera's view. When a clear image of the receipt 220 has been taken, the mobile device 202 can upload the photo of the receipt to the ad system 204 or, alternatively, store the image for later upload.

The ad system 204 can include a conversion processing module 222 for detecting receipt content with optical character recognition ("OCR") and determining whether an ad conversion has occurred based on the received receipt content. The conversion processing module 222 can send the receipt image to an OCR engine 224 to extract the content of the receipt details from the receipt image. For example, the OCR engine 224 can extract the business name, purchased product or service name, timestamp of purchase, X percentage off, Y dollar amount saved, or barcode from the receipt image.

The conversion processing module 222 can process content extracted locally using the OCR engine 224. In some other implementations, an application on the mobile device can perform OCR on the receipt to extract the business name, purchased product or service name, timestamp of purchase, X percentage off, Y dollar amount saved, or barcode. The camera application can send the text to the conversion processing module 222.

In some other implementations, a quick response ("QR") code on the receipt 220 can include the content of the relevant receipt details. The content can include business name, products or services purchased, date and time of purchase, or coupons used, to name a few examples. A camera application can capture the content from the QR code on the receipt 220 and provide the content to the conversion processing module 222.

The conversion processing module 222 includes an ad matching module 226. The ad matching module 226 can compare the receipt details from the extracted content with information stored e.g., in the ad logs 216. The ad matching module 226 can use a user identifier associated with the mobile device 202 (e.g., a user ID or device ID) to determine what ads have been presented to the user. Additionally, the ad matching module 226 can query the ad keywords file 212 for keywords associated with the ads presented to the user.

If the ad matching module 226 determines that at least one of the keywords corresponds to the purchased product or service, the ad system 204 can log an ad conversion in the conversion logs 218. In some implementations, the ad system 204 generates a new record in the conversion logs 218 for the ad conversion.

For example, the ad matching module 226 can use the extracted receipt content with the user identifier to determine which ad impression to the user corresponds to the product or service purchased. The ad matching module 226 can use the ad logs 216 for the timestamps and AdIDs of ad impressions to the user. In some implementations, the ad matching module 226 can select ad impressions that have been displayed within a specific time frame, e.g. thirty days before the timestamp of the purchase. The ad matching module 226 can select the specific time frame based, for example, on an average time between ad impressions and when the ad system 204 learns a user made an purchase at a physical retail location. In some implementations, the average time between impressions and conversions can be unique for each retail store.

The ad matching module 226 can use the AdIDs of the selected ads to lookup the keywords mapped to the AdIDs in the ad keywords file 212. The ad matching module 226 can compare an ad's keywords to the extracted receipt content to determine a degree of correlation between the keywords and the extracted receipt content. In some implementations, each ad keyword has a weight that indicates the importance of the associated keyword when determining if a conversion has occurred. The ad keywords file 212 can include the weight values for the ad keywords. For example, the ad matching module 226 can determine that the business name should be given more weight than other ad keywords.

The ad matching module 226 can assign a matching score to each AdID indicating a degree of correlation between the extracted receipt content and the keywords associated with the AdID. The ad matching module 226 can rank the AdIDs by matching score and send a message to the ad system 204 indicating that the ad system 204 should create an entry in the conversion logs 218 for the AdID with the highest matching score. In some implementations, conversions associated with physical retail locations that are determined using information sent from the mobile device 202 can be stored in separate logs in the conversion logs 218 from online conversions.

In some implementations, the ad matching module 226 includes one or more related terms for each keyword when assigning a matching score. These additional terms expand the keywords, for example, to reduce errors caused when the product name on the receipt does not exactly match the product name in the ad but could be a synonym or other related name. For example, an advertisement can be displayed on the mobile device 202 for purchasing shoes at a specific store. The user of the mobile device 202 can purchase slippers at the specific store. When the ad matching module 226 compares the extracted receipt content for the slippers, the ad matching module 226 can determine that the purchase of the slippers is a conversion for the shoe ad.

In another example, the ad matching module 226 can query the ad logs 216 to retrieve the AdIDs for the ads presented on to the user within a specified time range. For example, the query can include the date of purchase and instructions to return only the AdIDs for ads presented within fifteen days of the purchase date. Additionally, for identified ads presented to the user, the ad matching module 226 can query the ad keywords file 212 with the AdIDs to retrieve the keywords (and any associated expanded terms) associated with the presented ads.

The ad matching module 226 can create a matching score for the keywords associated with the presented ads and the receipt content. The matching score can be used to determine if the receipt is associated with a particular advertisement. Higher matching scores can indicate a greater correspondence between one or more ad keywords and the receipt content. A conversion can be logged for the ad corresponding to the highest matching score or scores or for one or more ads having a score that exceeds a specified threshold. The ad system 204 can store the conversion tracking information in the conversion logs 218.

In some implementations, if the matching score is below the specified threshold value (e.g., there is no correspondence) the ad matching module 226 determines that there was not an ad conversion and no information is stored in the conversion logs 218.

In some other implementations, the ad matching module 226 compares the names of text on the receipt 220 with ad keywords for each of the ads presented to the user within the specified time range in order to generate an overall matching score for the receipt.

In some implementations, a browser on the mobile device 202 can include a plug-in for scanning an image of the receipt 220 and sending the receipt image to the ad system 204. For example, the user can direct the browser to a website designed to upload receipt images. The website can display a sequence of pages leading the user through the steps for uploading the receipt image. For example, the website can direct the user to place the receipt onto a scanner connected to a user device (e.g., the mobile device 202), for example, using a Bluetooth connection. The user can upload the receipt image onto the user device and then submit the receipt image to the ad system 204.

In some implementations, when a user pays for products or services at a retail store, the mobile device 202 can receive an electronic version of the receipt from the retail store. The electronic version of the receipt can be in the form of an e-mail or a file uploaded directly onto the mobile device 202 from the retail store.

For example, the mobile device 202 can include a receipt conversion application that receives the receipt from the retail store. Upon receiving the receipt, the receipt conversion application can automatically upload the receipt to the ad system 204. The receipt conversion application can send the user identifier to the ad system 204. The ad matching module 226 can extract receipt content from the receipt, for example, by parsing the text content from the electronic version of the receipt and without the OCR engine 224 when the electronic version of the receipt is provided in text form (e.g., as an e-mail).

The receipt content can include fields that indicate the retail store name, the names of the purchased products or services, the date and time of the purchase, or coupons used. The ad matching module 226 can use the ad logs 216 to identify ads presented to the user. The ad matching module 226 can determine if the receipt indicates an ad conversion by comparing the receipt content with keywords associated with ads presented to the user. If the ad matching module 226 determines that a conversion has occurred, the ad system 204 can create a record in the conversion logs 218 for the conversion.

In another example, a receipt conversion application on the mobile device 202 can have an "e-mail my receipt" button that sends electronic receipts to the ad system 204. For example, the receipt conversion application can allow a user of the mobile device 202 to select an e-mail or another form of electronic receipt (e.g., a PDF file). Once an electronic receipt is selected, the user can select the "e-mail my receipt" button to send the electronic receipt to the ad system 204. In some implementations, the ad system 204 can accept both electronic receipts and photo receipts.

In some implementations, an advertiser can partner with the ad system 204 and share purchase transaction data. For example, when a user is purchasing a product from a retail store, the retail store can send the user an e-mail with receipt information. The retail store can also send an e-mail address of the user (which can be used to identify the corresponding user profile) and receipt information to the ad system 204 for conversion tracking. In some implementations, the ad system 204 receives a user identification ("userID") from the retail store along with the receipt information.

In another example, the retail store can connect to the mobile device 202 to retrieve payment information, such as credit card information or user account information. The retail store can connect to the mobile device 202 through a wireless connection (e.g., Bluetooth, or IEEE 802.11). The retail store can prompt the user for a password for additional security during the checkout process. The retail store can upload an electronic receipt to the mobile device 202. When the retail store securely connects to the mobile device 202 for transfer of the receipt, the retail store and the mobile device 202 can share device identification, such as a deviceID or an IP address. The retail store can send the deviceID or IP address with receipt details to the ad system 204 for conversion tracking.

In some implementations, a user can register with the ad system 204. For example, the user can register to receive incentives or other benefits (e.g., discounts, coupons, or other rewards) from the ad system 204. For example, the ad system 204 can assign points to a user every time the user uploads a receipt to the ad system 204. Point values can be determined based on the cost of the products or services, an advertiser specified value, a publisher specified value, or the number of ad conversions made (e.g., a user can receive one point for each ad conversion), to name a few examples. The advertisers, publishers, and/or the ad system 204 can agree to provide rewards to users who upload receipt images and what rewards or reward options to provide.

In another example, users can receive discounts for the advertiser business from which the user made a purchase when the ad matching module 226 identifies an ad conversion. The discounts can be in the form of coupons for the business. The coupons can be for specific products or services or for an individual transaction at the business (e.g., ten percent off all purchased products). For example, the user can receive a coupon for a free product or service with a purchase of fifty dollars or more. In another example, the user can receive a coupon a particular discount (e.g., 10%) off of their next purchase at the business.

In some implementations, a user can register a credit card, smart card, or gift card with the ad system 204. The ad system 204 can associate the card information with the particular user identifier or profile. When the user makes a purchase with the card at a retail store, the retail store can send receipt details to the ad system 204 including information identifying the card used to make the purchase.

The ad system 204 can determine the user associated with the card information. If no card information is found in the ad system, the ad system 204 determines that the user did not register card information with the ad system 204 and does not log any information.

When card information is found, the ad system 204 can use the receipt details to query the ad logs 216 for ads presented to the user. The ad matching module 226 can use the receipt details with keywords associated with ads presented on the mobile device 202 to determine if an ad conversion took place. The ad system 204 can provide rewards, points, or cash back to users based on the ad conversions.

In some implementations, a photo application on the mobile device 202 can prompt a user to send a receipt image when the mobile device 202 detects that the user is near a business location associated with a received ad. For example, the photo application can determine that the mobile device 202 is close to a sporting goods store associated with an ad presented on the mobile device (e.g., based on conversion location information provided with the ad such as GPS coordinates or an address). When the user has been near the location for a specified amount of time indicating that the user may have made a purchase, the photo application can prompt a user for a receipt image. The photo application can send the receipt image to the ad system 204.

In some implementations, the OCR engine 224 can use a barcode located on a receipt to query an advertiser's database that maps, for example, barcode values to particular goods or services. The ad system 204 and advertisers can form partnerships allowing the ad system 204 to access the database associated with the advertiser's retail locations. For example, a photo application on the mobile device 202 can send a receipt image to the ad system 204. The OCR engine 224 can extract the barcode from the receipt image. The barcode can then be decoded and the associated goods or services identified using the relevant advertiser's databases. In some implementations, the barcode includes additional information regarding the transaction including a time of purchase, location of purchase, name of retailer, and purchase price.

The OCR engine 224 can include one or more receipt templates 228 for commonly used receipt layouts (both generic and specific to individual retailers). Each of the receipt templates 228 can be for a specific advertiser. In some implementations, a receipt template can be used by multiple advertisers. The receipt templates 228 can identify specific information associated with a particular advertiser, such as fields, text, or images on the receipt 220 as well as their respective locations on the receipt. Fields can include business name, address, phone number, invoice total, or return policy, to name a few examples. The OCR engine 224 can match the receipt image to one of the receipt templates 228 during extraction of content from the receipt image.

The receipt templates 228 can be used to more accurately identify specific information in receipt image. For example, the OCR engine 224 can determine that the borders and spacing on the receipt image are similar to a specific template in the receipt templates 228. In another example, the OCR engine 224 can extract text from a top portion of the receipt image in order to determine the business the receipt is for. The OCR engine 224 can look at the specific template or templates in the receipt templates 228 associated with the business in order to identify a template that matches the receipt image. In some implementations, the OCR engine 224 can use a barcode or QR code located on the receipt image in order to identify a receipt template associated with the receipt image.

The OCR engine 224 can include one or more receipt terms 230. The receipt terms 230 can identify terms used in particular advertisers' receipts in order to assist the OCR engine 224 in the OCR process. In some implementations, the receipt terms 230 can relate fields in the receipt templates 228 with a specific set of advertiser terms. For example, Company A's receipt templates can include fields for the company name, address, phone number, etc. The receipt terms 230 can include "Company A," "100 Third Avenue South," and "123-4567" and relate the terms to the respective fields in the receipt templates.

The receipt terms 230 can also include logos or other images that normally appear on Company A's receipts and the text associated with the images. In some implementations, the OCR engine 224 can use the company name, address, logo, etc. during the OCR process. For example, if the OCR engine 224 recognizes a logo placed in the logo field of the receipt, the OCR engine 224 can use the text in the receipt terms 230 associated with the logo during the OCR process.

In some implementations, the OCR engine 224 can combine information from the receipt terms 230 with information from the ad logs 216 to generate a set of candidate text associated with ads presented on the mobile device 202. For example, a photo application on the mobile device 202 can send a receipt image to the ad system 204. The OCR engine 224 can identify a matching receipt template for the receipt image using the list of keywords associated with ads presented to the user (e.g., business name or location) and by matching fields in the receipt image with fields in the receipt templates 228. The OCR engine 224 can analyze the receipt for images and text associated with the receipt template and keywords identified for one or more of the presented ads.

In some implementations, the OCR engine 224 determines the orientation of the text in the receipt image before matching a receipt image with one of the receipt templates 228. For example, the OCR engine 224 can determine that the text on the receipt image is at a 170° angle and is not perfectly horizontal (e.g., at a 180° angle). The OCR engine 224 can rotate the text 10° clockwise until the text in the image is horizontal and then begin the OCR process.

In some implementations, the OCR engine 224 uses a machine learning module 232 to more accurately extract receipt content. The machine learning module 232 can be used for the data extraction, or for both the matching of a receipt image with the receipt templates 228 and data extraction. The machine learning module 232 can be trained on receipts from multiple businesses to more accurately extract the receipt content. In some implementations, the OCR engine 224 trains the machine learning module 232 with receipts and the receipt templates 228 to increase accuracy in matching the receipt 220 to one of the receipt templates 228. When a new advertiser forms a partnership with the ad system 204, the machine learning module 232 can be trained with new receipt templates for the new advertiser. In some implementations, the machine learning module 232 is updated (e.g., retrained or provided additional training) periodically. The machine learning module 232 can be updated monthly, yearly, or when receipt templates are changed or added.

In some implementations, the OCR engine 224 can determine words associated with abbreviations used in receipts. The OCR engine 224 can use text surrounding the abbreviations to help identify the words associated with the abbreviations. The OCR engine 224 can use the machine learning module 232 or another module during identification of abbreviations. Identification of words associated with abbreviations can improve the accuracy of the ad matching module 226 when determining whether an ad conversion has been made.

In some implementations, a camera application on the mobile device 202 can prompt the user to associate the receipt 220 with one of the ads that has been presented on the mobile device 202. For example, ads that have been presented on the mobile device 202 can be stored following presentation. When the user takes an image of the receipt 220, the camera application can ask the user which of the stored ads caused the user to purchase the products or services on the receipt 220. In some implementations, the user can select more than one ad. The camera application can send the AdIDs of the selected ads along with an image of the receipt 220 to the ad system 204 for verification and processing. For example, the OCR engine 224 can extract the text from the receipt image to determine the receipt content. The ad matching module 226 can compare the keywords associated with the provided AdIDs to the receipt content and verify that the ads are related to the purchased products or services. The ad matching module 226 can then store conversion information in the conversion logs 218.

The ad system 204 can be one system as described above, or several different systems networked together and performing particular functions. For example, a conversion system can include the conversion processing module 222, an ad system can include the ad presentation module 208, the ad logs 216, and the ad keywords file 212, and a conversion system can include the conversion logs 218. In another example, an ad system can include the ad presentation module 208, a tracking system can include the ad logs 216, the conversion logs 218, and the ad keywords file 212, and the conversion system can include the ad matching module 226. In this example, receipt details are extracted from a QR code on the receipt 220 or from an electronic receipt.

Figure 3:
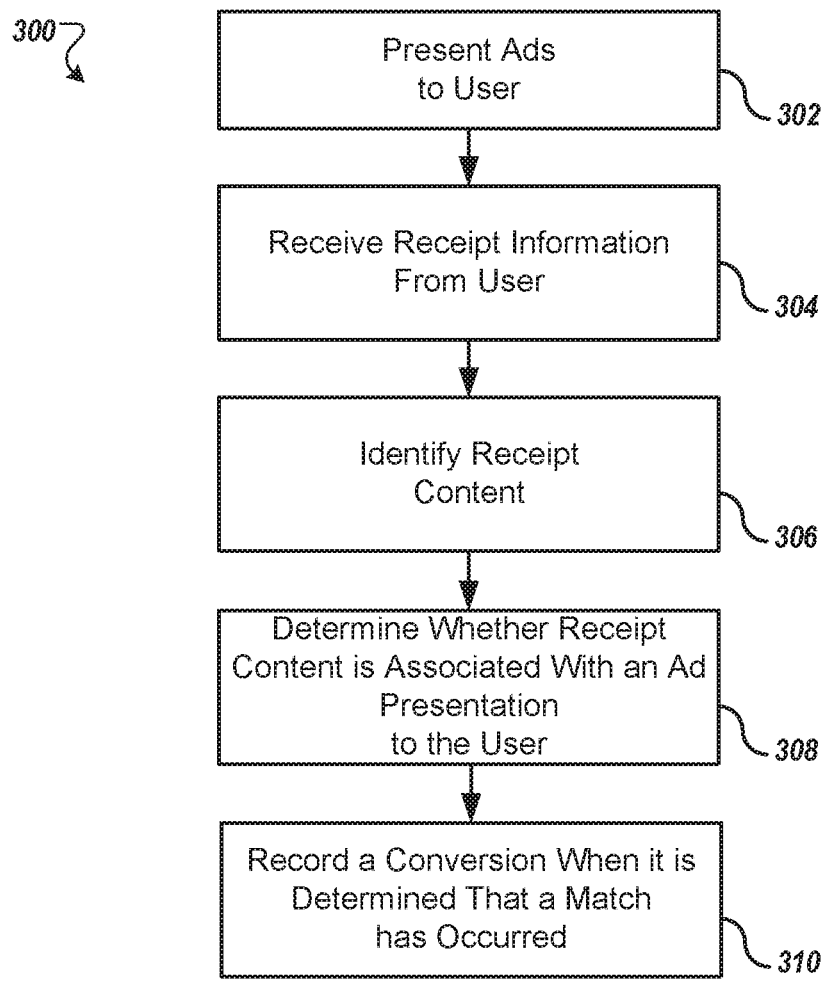
FIG. 3 is a flow chart of an example method for identifying conversions associated with physical retail location redemptions.

FIG. 3 is a flow chart of an example method 300 for identifying conversions associated with physical retail location redemptions. An ad system (e.g., the ad system 204) and parts thereof will be referred to in the following as examples. The method 300 can be performed by one or more other systems in conjunction with or instead of the ad system.

Ads are presented to a user (302). For example, the ad system can receive a request for content (e.g., ads) from the user of a computing device (e.g., the mobile device 202). The ad system can select ads for presentation on the computing device. The ad system can send the requested content with the selected ads to the computing device or to a publisher (e.g., a web page publisher) or search engine for presentation to the user. For example, a web browser can present the selected ads in a user interface as part of the requested content or can present the ad along with search results.

The ads can be for products or services available for purchase by the user at a physical retail location. The user can interact with the presented ads to receive more information about the products or services. In some implementations, the user can purchase the advertised products and services electronically through the web. Additionally, the user can go to a physical location (e.g., a retail store) to find additional information about or to purchase the advertised products or services.

Point of sale receipt information (e.g., a receipt image) is received from the user (304). For example, an ad system (e.g., ad system 204) can receive receipt information from the computing device for products or services purchased by the user in a retail store. Receipt information can include receipt photos, electronic documents of receipts (e.g., PDF files), or images of electronic receipts (e.g., screenshots, scanned images). For example, the receipt image can be a photo of the user's receipt taken by a mobile device or a camera. The user can send the image of the receipt to the ad system. The ad system can receive the receipt image and store the receipt image in memory.

In some implementations, the ad system receives the receipt image from a retail store. For example, the ad system can receive an electronic receipt image along with a user identifier or e-mail address associated with the person who purchased one or more products or services from the physical retail store. The ad system can query a file or database to identify the person using the user identifier or e-mail address.

In some implementations, the user initiates a camera application on the computing device in order to capture a photo of a receipt after the user has purchased a product or service. The camera application can activate a camera connected to or a part of the computing device. The camera application can present one or more prompts to the user indicating the steps the use needs to make in order to create a receipt image. The camera application can guide the user so that a clear photo of the receipt is captured. The camera application can display a box around the receipt details (e.g. business name, item or service name, timestamp of purchase) to ensure that the receipt details are in the camera's view and the user focuses on the receipt details.

The ad system can also receive user information along with the image. For example, the ad system can receive the a user identifier (e.g., a user ID or a deviceID)

Image content is identified (306). For example, the ad system identifies text associated with the receipt image. The ad system can detect the time of purchase, purchased product or service information, company name, company address, customer name, or any other information listed on the receipt image. The ad system can identify receipt text in a different way for each type of receipt. For example, an OCR engine (e.g., the OCR engine 224) included in the ad system can extract text from receipt images, and images of electronic receipts. The ad system can extract image text from PDF receipts using form fields and names assigned to the form fields. For example, the ad system can extract the business names from the form field labeled "business name" in PDF files.

The ad system can include receipt templates (e.g., the receipt templates 228) and receipt terms (e.g., the receipt terms 230) to assist in the OCR process. The OCR engine can use receipt templates in identifying the layout of receipt images and where common information (e.g., business name, total cost, purchased products or services) is located on receipt images. The OCR engine can use the receipt terms in identifying text in the receipt images during the OCR process. In some implementations, receipt templates or receipt terms are business specific. For example, the OCR engine can determine that a receipt template for a specific business is associated with a receipt image. The OCR engine can query the receipt terms for a list of terms associated with the specific business of the template. The OCR engine can use the list of terms associated with the specific business during the OCR process of the receipt image associated with the specific business.

In some alternative implementations, a text receipt is received. For example, an e-mail version of a receipt can be text based. The user can send the e-mail receipt to the ad system for processing. The ad system can parse the text directly without performing OCR.

A determination is made whether the receipt content is associated with an ad presentation to the user (308). For example, an ad matching module (e.g., the ad matching module 226) can determine whether ads have been presented on the computing device. The ad matching module can query ad logs (e.g., the ad logs 216) determine which ads have been presented to the user. The ad matching module can receive keywords associated with the ad impressions to the user and determine the degree to which ad keywords match extracted text from the image.

The ad matching module can create matching scores for the ad impressions by comparing the keywords associated with the ad impression and the identified receipt image text. Each matching score can indicate how related an ad impression is to the identified receipt image text (e.g., how related the purchase is to the products, services or offers advertised in the ad impression). In some implementations, the ad matching module compares key values in the image text with the keywords.

For example, the OCR engine can identify the business and receipt template for the receipt image. During the OCR process, the OCR engine can determine that the user purchased a product at one of "Company B's" stores. The ad matching module can compare the keywords associated with the ad impressions on the computing device looking for monitor and "Company B."

If the ad matching module identifies one ad impression for Company B advertising a particular product, the ad impression will have a high matching score. The ad matching module can rank the matching scores from highest to lowest. The ad matching module can determine that the ad impression with the highest matching score prompted the user to make a purchase. If the ad matching module does not find a matching score with a high enough value, the ad matching module can determine that no ad conversion was made.

A conversion is recorded when it is determined that a match has occurred (310). For example, if the ad matching module determined that the ad impression with the highest matching score is an ad conversion, the ad system can create a record in a conversion log (e.g., the conversion logs 218) recording the conversion. In some implementations, the ad system can also update the ad logs to indicate that the ad impression with the highest matching score was converted.

Figure 4:
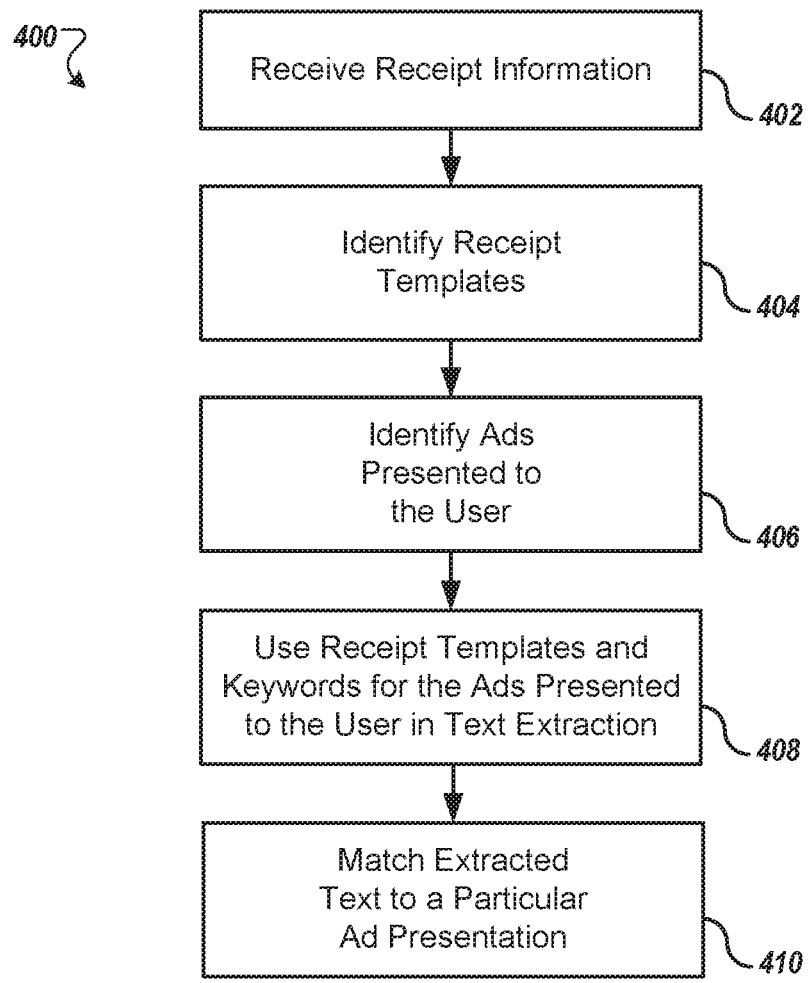
FIG. 4 is a flow chart of an example method for processing a receipt.

FIG. 4 is a flow chart of an example method 400 for processing a receipt. An ad system (e.g., the ad system 204) and parts thereof will be referred to in the following as examples. The method 400 can be performed by one or more other systems in conjunction with or instead of the ad system.

Receipt information is received (402). For example, a conversion processing module (e.g., the conversion processing module 222) can receive point of sale receipt information, e.g., as a receipt image or other electronic receipt. The conversion processing module can receive the receipt image from the ad system or a computing device (e.g., the mobile device 202). The receipt information can be for products or services purchased by a user at a business or other physical retail location. The conversion processing module can receive additional information with the receipt information. Additional information can include user identification information, such as deviceID, userID, e-mail address, AdCookies, or conversion cookies, to name a few examples.

Receipt templates are identified (404). For example, an OCR engine (e.g., the OCR engine 224) can identify receipt templates associated with a receipt image. The identified receipt templates can be a subset of a group of receipt templates (e.g., the receipt templates 228) stored in a file system or in a database.

The OCR engine can identify the receipt templates based on a signature in an electronic receipt image. For example, the signature can include a business name. The OCR engine can identify all receipt templates associated with that specific business. In another example, the OCR engine can process part of a receipt image in order to determine the business name listed in the receipt image (e.g., the name of the business where the products or services were purchased). In some implementations, the OCR engine identifies a single receipt template for the receipt image.

Ads presented to the user are identified (406). For example, a received user identifier can be used with ad logs to identify ads presented to the user of the computing device. The OCR engine can receive a list of keywords associated with the presented ads.

Receipt templates and keywords for the ads presented to the user are used in text extraction (408). For example, the OCR engine can use the list of keywords and the receipt templates during extraction of text from the receipt image. The OCR engine can use the receipt templates to determine the layout of text in the receipt image. The OCR engine can determine specific fields in the receipt image based on the template and extract text from those fields. The extracted text can be compared with the keywords for particular presented ads.

Extracted text is matched to a particular ad presentation (410). In particular, the degree of matching can be used to determine whether or not the received receipt information is associated with a particular ad presentation. For example, an ad matching module (e.g., the ad matching module 226) compares the identified keywords associated with the presented ads with text extracted from the receipt image in order to determine matching scores for the presented ads. The ad matching module can use weights for each keyword associated with an ad. The weights can be used to adjust how much a specific keyword associated with an ad affects the matching score for the ad (e.g., a business name or product name can have a higher weight than the date or city address). In some implementations, there is one weight for each keyword associated with an ad. In some implementations, the weights are combined to provide an overall score with respect to each presented ad. The ad matching module can rank the presented ads with the matching scores associated with the ads. The ad matching module can determine that the ad with the highest matching score is associated with the receipt image.

In some implementations, the ad matching module determines that more than one ad is associated with the receipt image. For example, the user of the computing device can be presented with "ad A," "ad B," and "ad C," all for products sold at "Company C." The user can shop at Company C and pick up the three products that were advertised in ads A, B, and C respectively. The conversion processing module can receive an electronic receipt (e.g., an e-mail) from the user, indicating that the user purchase three products. The ad matching module can extract text from the electronic receipt and compare the extracted text with keywords associated with ads presented on the computing device. The ad matching module can determine that ads A, B, and C have matching scores that indicate the ads A, B, and C are for products listed on the electronic receipt. The ad matching module can log a conversion in conversion logs (e.g., the conversion logs 218).

Figure 5:
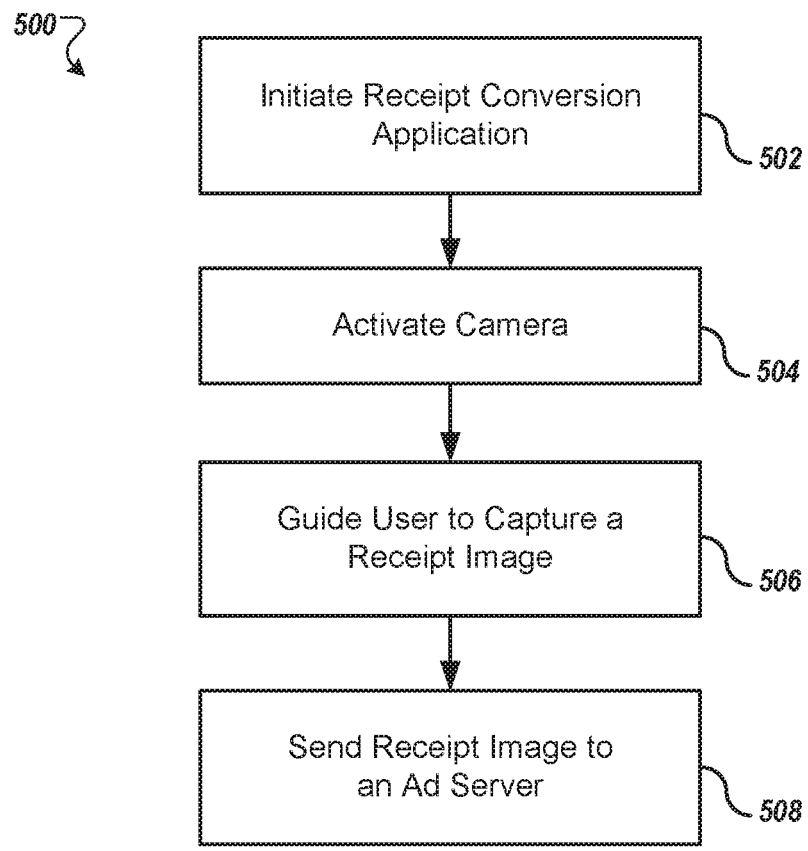
FIG. 5 is a flow chart of an example method for sending a receipt image.

FIG. 5 is a flow chart of an example method 500 for sending a receipt image. A computing device (e.g., the mobile device 202) and parts thereof will be referred to in the following as examples. The method 500 can be performed by one or more other systems in conjunction with or instead of the mobile device.

A receipt conversion application is initiated (502). For example, a user of the computing device can launch the receipt conversion application. The receipt conversion application can be used to take an image of a receipt. The receipt can be for products or services purchased by the user at a physical retail store. In some implementations, the receipt can be for surveys, discussion groups, or questionnaires participated in, to name a few examples.

A camera is activated (504). For example, the receipt conversion application can take the user through the steps of taking a receipt image. The receipt conversion application can activate the camera built into the computing device. The receipt conversion application can use the camera to take an image of the receipt. In some implementations, the camera is a device external to the computing device. The receipt conversion application can direct the user to attach the camera to the computing device with a cable or a wireless connection.

A user is guided to capture a receipt image (506). For example, the receipt conversion application can display a prompt guiding the user to take a picture of the receipt with the camera. The receipt conversion application can present a digital image of the receipt to the user on a user interface. The digital image can be presented on a liquid crystal display, an organic light emitting diode display, or a cathode ray tube, to name a few examples. In some implementations, the display is part of a viewfinder. The receipt conversion application can present boxes as guides to frame content displayed on the receipt and improve the image taken. The boxes can indicate portions of the receipt that are in focus for the camera, need to be in focus, or any combination thereof. The receipt conversion application can guide the user to take an image of the receipt.

The receipt image is sent to an ad server (e.g., the ad system 204) (508). For example, the receipt conversion application can send the receipt image to the ad server for processing. The ad server can extract text from the receipt and determine if the receipt is for products or services advertised on the computing device. The ad server can log a conversion in a conversion log (e.g., the conversion logs 218) if a conversion is found.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage media for execution by, or to control the operation of, data processing apparatus. The computer storage medium can be, or be included in, a computer-readable storage device, a computer-readable storage substrate, a random or serial access memory array or device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A mobile telecommunications device comprising:
a camera;
a GPS receiver; and
an application executed by a data processing apparatus that interacts with the camera, the GPS receiver, and one or more remote servers, wherein the application causes the data processing apparatus to perform operations comprising:
presenting, in a display of the mobile telecommunications device, a digital presentation of a document;
guiding a user to capture an image of the document, including:
presenting, within the display of the mobile telecommunications device, a user interface feature that visually frames a particular subset of information from the document that is presented in the display with other information from the document; and
capturing the image of the document when the particular subset of information is focused within the user interface features that visually frames the particular subset of information; and
uploading the captured image of the document to the one or more remote servers.

2. The telecommunications device of claim 1, wherein the application causes the data processing apparatus to perform operations comprising:
determining, based on data provided by the GPS receiver, that the mobile telecommunications device is at a specified geographic location; and
in response to determining that the mobile telecommunications device is at the specified geographic location, activating the camera.

3. The mobile telecommunications device of claim 2, wherein the application performs operations further comprising:
determining that the mobile telecommunications device has been located near the specific location for at least a specified amount of time, wherein activating the camera comprises activating the camera in response to the determination that the mobile telecommunications device has been located near the specified location for at least the specified amount of time.

4. The mobile telecommunications device of claim 1, wherein presenting a user interface feature that visually frames a particular subset of information from the document comprises displaying, within the display of the mobile telecommunications device, a box that visually identifies a location of the particular subset of information in the document.

5. The mobile telecommunications device of claim 4, wherein the box indicates that a portion of the document needs to be in focus.

6. The mobile telecommunications device of claim 4, wherein the box indicates that a portion of the document is in focus.

7. A method comprising:
presenting, in a display of the mobile telecommunications device, a digital presentation of a document;
guiding a user to capture an image of the document, including:
presenting, within the display of the mobile telecommunications device, a user interface feature that visually frames a particular subset of information from the document that is presented in the display with other information from the document; and
capturing the image of the document when the particular subset of information is focused within the user interface features that visually frames the particular subset of information; and
uploading the captured image of the document to the one or more remote servers.

8. The method of claim 7, further comprising:
determining, based on data provided by a GPS receiver, that the mobile telecommunications device is located near a specified location that is associated with the document; and
activating the camera in response to the determination that the mobile telecommunications device is located near the specified location.

9. The method of claim 8, the method further comprising:
determining that the mobile telecommunications device has been located near the specific location for at least a specified amount of time, wherein activating the camera comprises activating the camera in response to the determination that the mobile telecommunications device has been located near the specified location for at least the specified amount of time.

10. The method of claim 7, the method further comprising:
determining, based on information provided by the GPS receiver, that the mobile telecommunications device is located near a specified location; and
presenting, in the display, a prompt instructing the user to capture an image of the document based on the mobile telecommunications device being located near the specified location.

11. The method of claim 7, wherein presenting a user interface feature that visually frames a particular subset of information that is included from the document comprises displaying, within the display of the mobile telecommunications device, a box that visually identifies a location of the particular subset of information in the document.

12. The method of claim 11, wherein the box indicates that a portion of the document needs to be in focus.

13. The method of claim 11, wherein the box indicates that a portion of the document is in focus.

14. One or more non-transitory computer-readable media comprising instructions that, when executed by a processor, cause the processor to:
present, in a display of the mobile telecommunications device, a digital presentation of a document;
guide a user to capture an image of the document, including:
presenting, within the display of the mobile telecommunications device, a user interface feature that visually frames a particular subset of information from the document that is presented in the display with other information from the document; and capturing the image of the document when the particular subset of information is focused within the user interface features that visually frames the particular subset of information; and upload the captured image of the document to the one or more remote servers.

15. The computer-readable media of claim 14, wherein the instructions cause the processor to:

determine, based on data provided by the GPS receiver, that the mobile telecommunications device is at a specified geographic location; and in response to determining that the mobile telecommunications device is at the specified geographic location, activate the camera.

16. The computer-readable media of claim 15, further comprising instructions, that, when executed by the processor, cause the processor to:

determine that the mobile telecommunications device has been located near the specific location for at least a specified amount of time, wherein activating the camera comprises activating the camera in response to the determination that the mobile telecommunications device has been located near the specified location for at least the specified amount of time.

17. The computer-readable media of claim 14, wherein presenting a user interface feature that visually frames a particular subset of information that is included in the document comprises displaying, within the display of the mobile telecommunications device, a box that visually identifies a location of the particular subset of information in the document.

18. The computer-readable media of claim 17, wherein the box indicates that a portion of the document needs to be in focus.

* * * * *